United States Patent
Guilfoyle et al.

(10) Patent No.: US 10,972,305 B2
(45) Date of Patent: Apr. 6, 2021

(54) POWER LINE COMMUNICATIONS NETWORK SYSTEM FOR A SPA

(71) Applicant: Bullfrog International, LC, Bluffdale, UT (US)

(72) Inventors: Jeffrey J. Guilfoyle, San Diego, CA (US); Eric Hales, Eagle Mountain, UT (US)

(73) Assignee: Bullfrog International, LC, Herriman, UT (US)

( * ) Notice: Subject to any disclaimer, the term of this patent is extended or adjusted under 35 U.S.C. 154(b) by 0 days.

(21) Appl. No.: 16/015,498

(22) Filed: Jun. 22, 2018

(65) Prior Publication Data

US 2019/0394060 A1    Dec. 26, 2019

(51) Int. Cl.
*H04L 12/28*    (2006.01)
*H04B 3/54*    (2006.01)

(52) U.S. Cl.
CPC ............ *H04L 12/282* (2013.01); *H04B 3/54* (2013.01); *H04L 2012/285* (2013.01); *H04L 2012/2843* (2013.01)

(58) Field of Classification Search
CPC ........... H04L 12/282; H04L 2012/2843; H04L 2012/285; H04B 3/54
USPC ...................................................... 340/12.32
See application file for complete search history.

(56) References Cited

U.S. PATENT DOCUMENTS

| | | | | |
|---|---|---|---|---|
| 4,780,917 A * | 11/1988 | Hancock | ................ | A61H 33/02 4/541.2 |
| 2002/0011923 A1* | 1/2002 | Cunningham | ......... | H04B 3/542 340/12.32 |
| 2002/0035403 A1* | 3/2002 | Clark | ................ | G01N 33/1886 700/65 |
| 2002/0070611 A1* | 6/2002 | Cline | ................... | A61H 33/005 307/149 |
| 2004/0244103 A1* | 12/2004 | Laflamme | .............. | A61H 33/60 4/541.1 |
| 2006/0126617 A1* | 6/2006 | Cregg | .................... | H04B 47/19 370/389 |
| 2008/0013227 A1* | 1/2008 | Mernyk | ................ | H02H 3/335 361/42 |
| 2008/0197788 A1* | 8/2008 | Conover | ............... | H05B 45/20 315/291 |
| 2014/0277777 A1* | 9/2014 | Potucek | ................ | H04B 47/10 700/282 |
| 2014/0303757 A1* | 10/2014 | Pruchniewski | ......... | H04L 61/20 700/90 |

(Continued)

*Primary Examiner* — Yong Hang Jiang
(74) *Attorney, Agent, or Firm* — Dentons Durham Jones Pinegar; Sarah W. Matthews; James A. Larson (57) ABSTRACT

A system for power line communications between an in-home wireless network and a pool or spa. The system may include a spa network interface in electrical wired connection to an in-home network interface. The spa power line communication module may be hard wired to a spa control unit, and power to the spa may be provided by one or more of a first 120V conductor having a first phase of power, a second 120V conductor having a second phase of power, a ground conductor, and a neutral conductor. The system may optimize the connection between the in-home powerline communications module connected to one phase of power via a home receptacle, and the spa powerline communications module by testing the connection over each conductor and selecting the conductor with the best throughput.

14 Claims, 5 Drawing Sheets

(56) References Cited

U.S. PATENT DOCUMENTS

2017/0164452 A1* 6/2017 Lyons, Sr. ................ G09G 3/32
2018/0287664 A1* 10/2018 Laifenfeld ............. H04B 3/542

* cited by examiner

POWER LINE COMMUNICATIONS NETWORK SYSTEM FOR A SPA

TECHNICAL FIELD

This disclosure relates generally to power line communications systems for pools and spas, more specifically, power line communications system features for improved user control over such pools and spas. The features disclosed herein are numerous in nature and may be utilized in a number of different ways to provide the same or similar power line communications control results.

RELATED ART

Wireless networking, such as WiFi® protocols, to control home appliances and fixtures is desirable for a number of reasons, and consumers continue to demand technologies that allow them to control various electronics of their home from a remote computing device, such as a smartphone. While wireless networking of a pool or spa may be convenient and provide extra safety and cost-savings benefits to consumers, there are several issues that traditional wireless networking presents in the pool and spa environment. For example, spas and pools are often installed far away from the main house, and have obstacles both natural (trees, hills, line-of-sight) and manmade (retaining walls, such as those with stucco construction often contain metal mesh that blocks wireless network signals). Water also negatively affects wireless signals, often making wireless networking for communication to a pool or spa unfeasible. Additionally, it is often impractical to install additional wiring to create a dedicated network connection to pool and spa equipment, both from a physical perspective (cables are often underground), and due to the interference traditional network cables will receive from the distance to the pool or spa, ground potential differences, and large power usage of the pool or spa.

Powerline communications allow data to be transmitted over existing electrical wiring and may provide an advantage over traditional WiFi protocols. However, existing powerline communications do not achieve the best throughput or connectivity if both ends of the network connection are not on the same phase of electric power. Electrical receptacles or outlets located in homes in the U.S. are wired to the home's circuit breaker panel to receive power. The circuit breaker in turn receives power from the utility line, which in the U.S. is typically single split-phase electric power. Depending on the location of the receptacle or outlet in the home, it will receive power from one of the two 120V conductors from the breaker panel, and thus one of the two phases of the single-split phase electric power. Receptacles are not typically labeled or marked in a way that may allow an average home owner to determine which phase of the single-split phase of electric power any given outlet or receptacle is receiving.

While power line communications may provide better connectivity compared to many wireless networking protocols, it may be difficult to achieve the best throughput and connectivity if one end of the network interface is connected to a different phase of power than the other end of the network interface. The power line communications system disclosed herein takes into account the difficulty of determining which outlet in the home receives which phase of power, while at the same time increasing the fidelity of the system's connection in order to provide control of the spa from a remote location.

SUMMARY

This disclosure, in at least one aspect, relates to the use of a power line communications system to allow a user to control a pool or spa from a remote location. More generally the power line communications system may utilize existing powerlines to allow a home network to communicate with the control panel of a pool or spa. The system may include a spa network interface and an in-home network interface.

The spa network interface may include a powerline communications module that is hardwired to a spa's controller. The hardwiring may include, for example, a first 120V conductor having a first phase of a single split-phase of power, a second 120V conductor having a second phase of a single split-phase of power, a neutral conductor, and/or a ground wire.

The power line communications system may include a signal bridge and electronic relay that may be used to optimize the connection between the in-home network interface and the spa network interface. According to one aspect, a method is provided wherein the electronic relay may test the data connection over two or more conductors, and select the conductor with the best throughput.

Selecting the best route for the power line communications may be accomplished by at least some of the following components: a signal bridge to conduct the necessary data frequencies from one circuit to another circuit.

There is a plurality of means and methods for achieving a powerline communication system for a pool or spa with high throughput and connectivity and multiple variations are disclosed herein. Other aspects, as well as features and advantages of various aspects of the disclosed subject matter will become apparent to one of ordinary skill in the art form the ensuing description, the accompanying drawings and the appended claims.

BRIEF DESCRIPTION OF THE DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views. The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

DETAILED DESCRIPTION

FIGS. 1-4 illustrate schematic diagrams of an embodiment of a power line communications system 10 for utilization in a spa or pool 18. The power line communications system may comprise a spa network interface 12 and an in-home network interface 14 in electrical connection via a powerline communication connection 16. The spa network interface 12 may be located integrally or in proximity to a spa 18. The spa network interface 12 may include, for example, a control unit 20 electrically connected to one or more spa controllers 22. The control unit 20 may also be provided with a user interface 24. The spa network interface 12 also comprises one or more powerline communications modules 26.

The powerline communications module 26 may enable data and electricity to be carried via the electrical wiring from a residence to the spa 18. Many types of powerline communications modules or specifications are known in the art. For example, Ethernet over power or broadband over powerlines protocols include HomePlug, Powerline, and other broadband over powerline and/or Ethernet over power devices. In one configuration, a HomePlug-type powerline communications module 26 may be directly wired to the spa control unit 20 as part of the spa network interface 14.

The user interface 24 of the spa network interface 14 may allow a user at the spa 18 to easily select and control one or more settings on a spa controller 22. For example, settings may include lights, music, water features, jets, temperature, opening of a spa cover, etc. Settings may also include pre-determined and/or user-defined custom settings. Such as a setting for a particular user, a particular event, or a particular time of day. Settings selected or inputted by a user on the user interface 24 at the spa 18 may not only cause the spa controllers 22 to implement such settings, but may also cause the powerline communications module 26 to communicate such settings to a home network 28 as described below. In this manner, another spa user who is remote from the spa may be able to determine, in real-time, the settings on the spa 18. This may provide advantages such as increased safety (in particular to determine if a spa cover is in place or not when children and/or pets may be present), increased energy efficiency, and improved ease of use of the spa.

Figure 1:
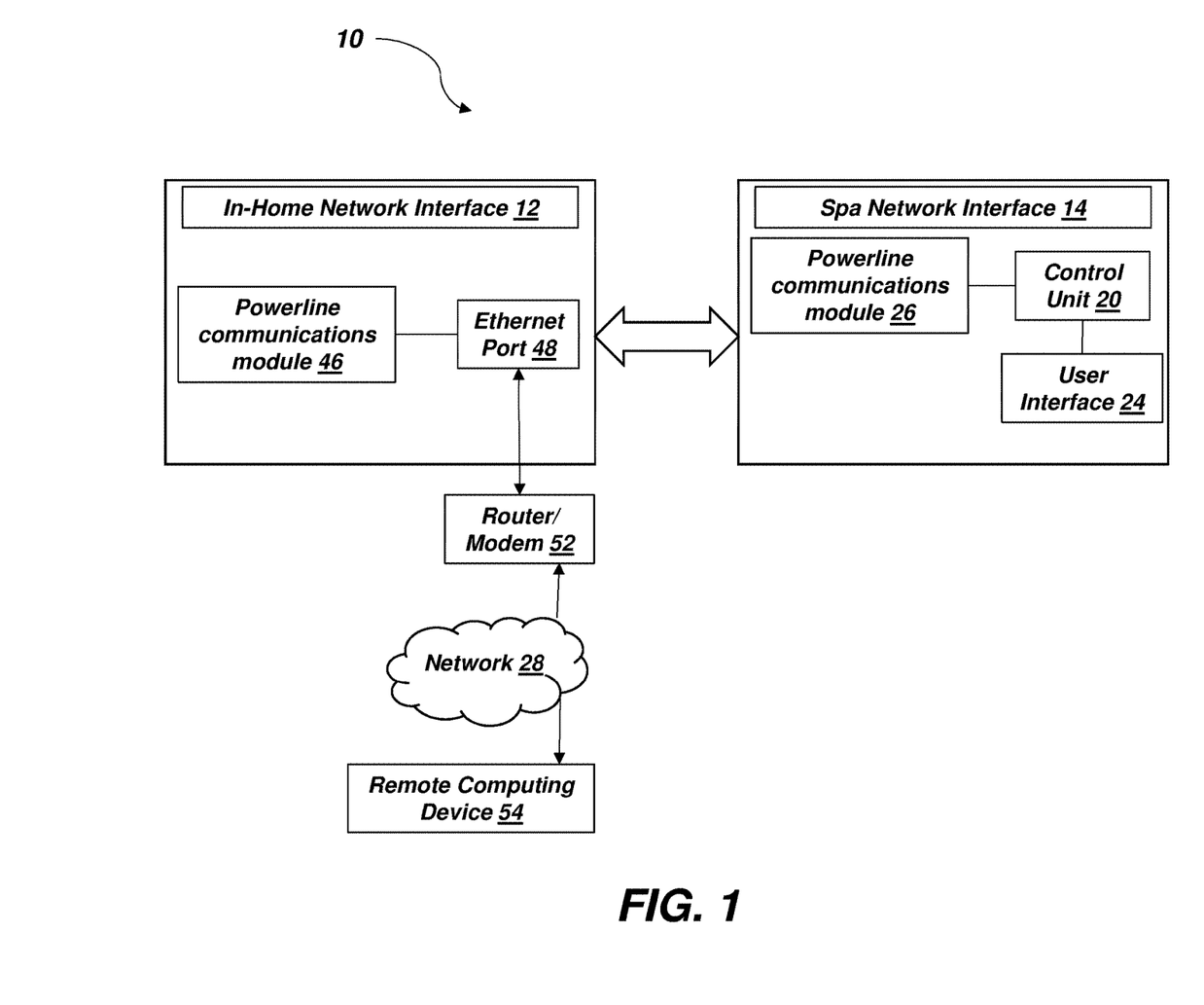
FIG. 1 is a schematic diagram of a configuration of a power line communications system comprising a spa network interface and an in-home network interface.
Figure 2:
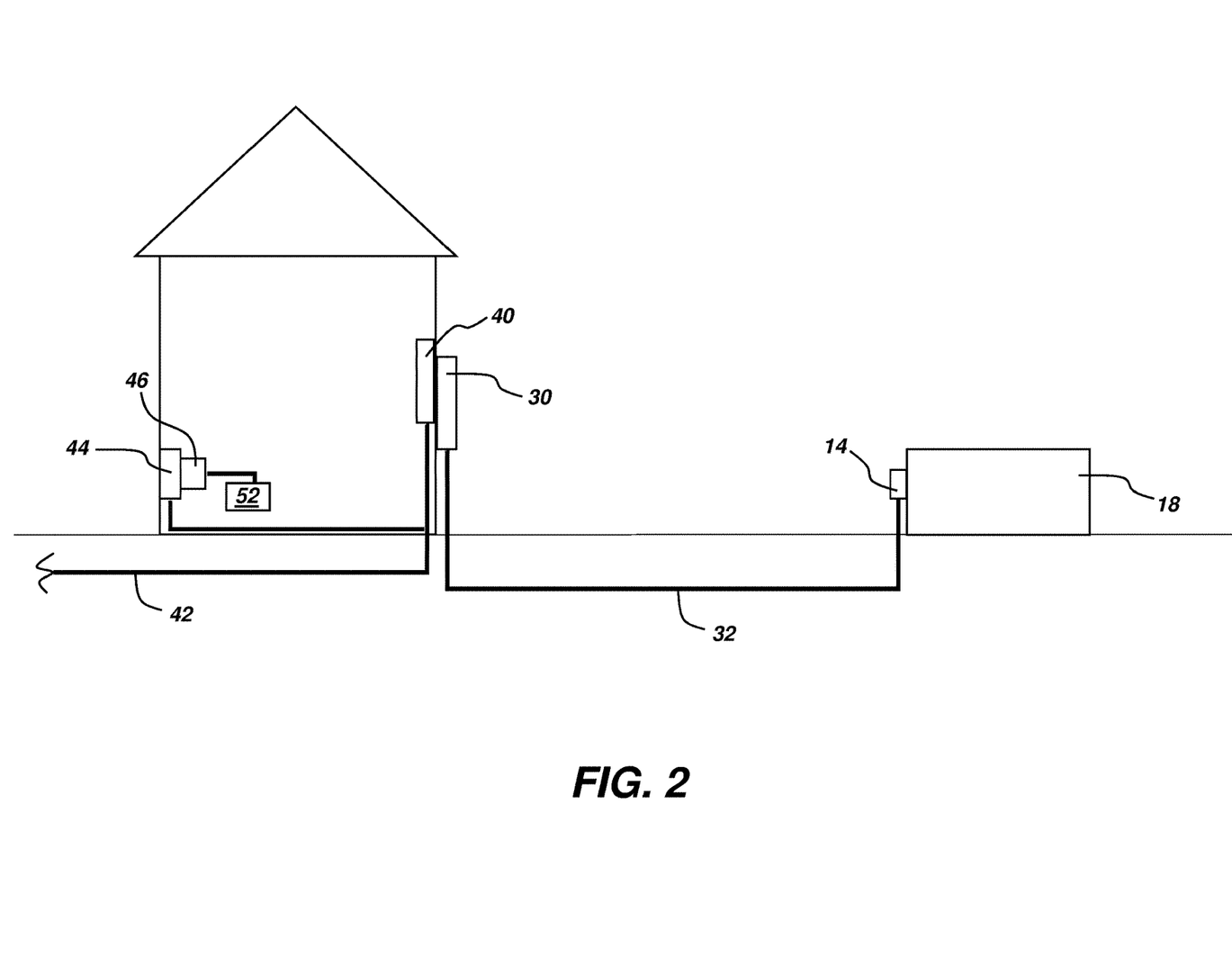
FIG. 2 is a schematic diagram of a configuration of a power line communications system according to one method of use in a home and spa.
Figure 3:
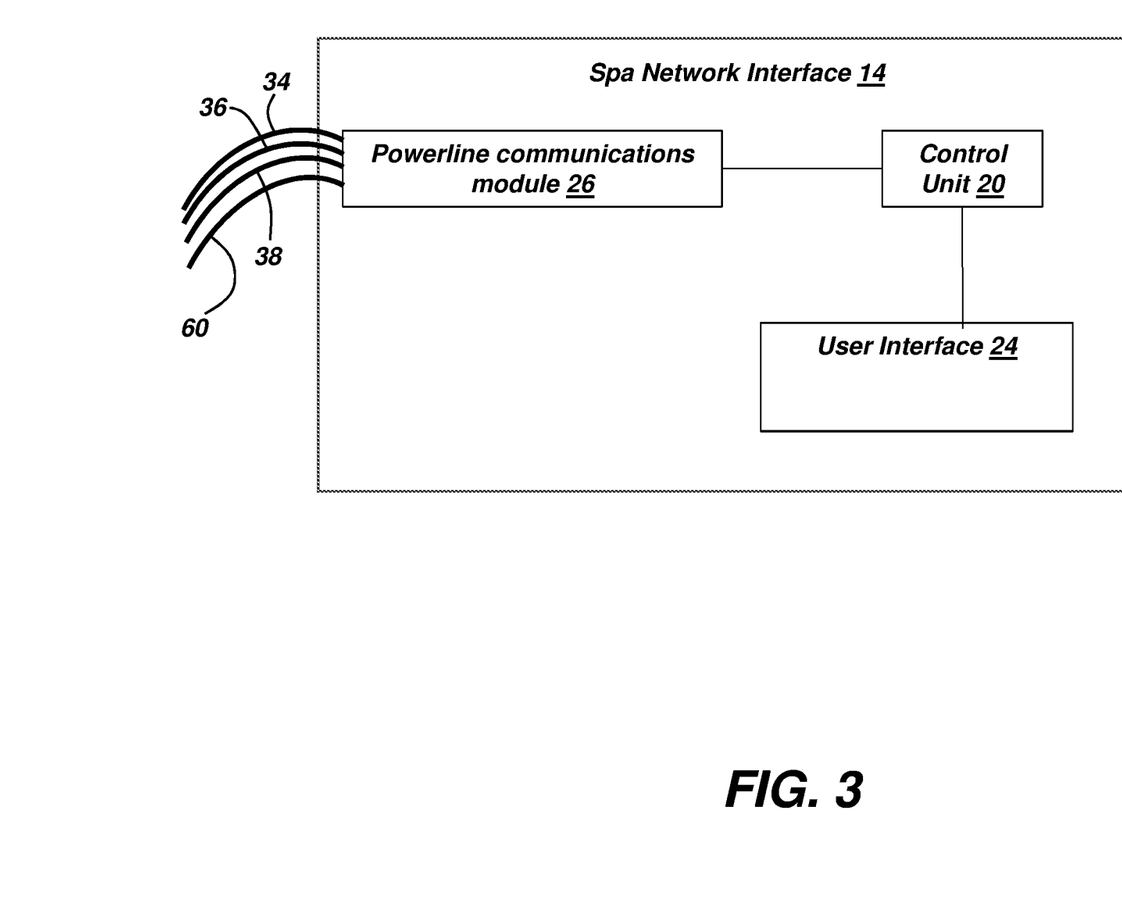
FIG. 3 is a schematic diagram of a spa network interface.

The spa powerline communications module 26 may allow communication between the spa network interface 14 and the in-home network interface 12 via powerline communication 16. Such communication may exist over existing home electrical lines. For example, the spa network interface may be directly wired to the spa powerline communications module 26, as well as one or more conductors. Conductors which provide power to the spa are typically run from a spa electrical panel 30 located at or near the home (seen in FIG. 2) through a buried conduit 32 to the spa network interface 14 of the spa 18. The conduit 32 may be buried or may be above ground. Any suitable conductors may be used, but in one configuration, it is contemplated that three conductors, plus a ground wire may be provided: a first 120V conductor 34, a second 120V conductor 36, and a third neutral conductor 38 (FIG. 3). A ground wire 60 is also typically provided for safety. The two 120V conductors are hot legs typically provide a total of 240V (120V+120V), typically each having a different phase. The hot leg with the neutral conductor 38 typically provides 120V, and the ground wire typically carries no current except when a short circuit to the ground occurs.

The spa electrical panel 30 may be wired to an existing residential circuit breaker panel 40. The circuit breaker panel 40 may in turn receive electrical power from existing power lines 42 coming from an electric utility line (such as single-split phase electric power), and then distribute power to receptacles 44 located in the home. Single-split phase electric power typically supplies two lines, each of a different phase, and a neutral conductor. Electrical receptacles or outlets 44 located in the home may be wired to the circuit breaker panel 40 to receive power. Such wiring may typically be to a neutral conductor and one of a first conductor of 120V and a second conductor of 120V, where the first and second 120V conductors each have a different phase the single-split phase of power. Depending on the location of the receptacle or outlet 44 in the home, it will receive one of the two 120V conductors, and thus one of the two phases of the single-split phase electric power. Receptacles 44 are not typically labeled or marked in a way that may allow an average home owner to determine which phase of the single-split phase of electric power the receptacle 44 is receiving.

The in-home network interface 12 may comprise any suitable powerline communications module 46 (such as a HomePlug device), which may be electrically plugged into any home outlet or receptacle 44. The in-home powerline communications module 46 may also include an Ethernet port 48. The Ethernet port 48 allows the in-home networking interface 12 to be connected via an Ethernet cable 50 to a home router/modem 52. It will be appreciated that the powerline communications module 46 may be connected to a modem, a router that is connected to a modem, or a device that is a combination of a router and a modem. Reference to a router/modem 52 herein contemplates any of these suitable options.

The router/modem 52 may be in communication with a home network 28. Such a network may be, for example, a wireless network that utilizes any suitable wireless protocol. The network 28 may connect to the internet and allow information to be transmitted to a remote computing device 54. The remote computing device 48 may also be used to input controls to the network 28, which may then be communicated, via the powerline communications 16, from the in-home network interface 12 to the spa network interface 14. The present system may be used with any suitable remote or local computing device 54, such as a smartphone which may be provided with a user interface, such as an application specific to the system for receiving system information and inputting system commands, described in more detail below.

Figure 4:
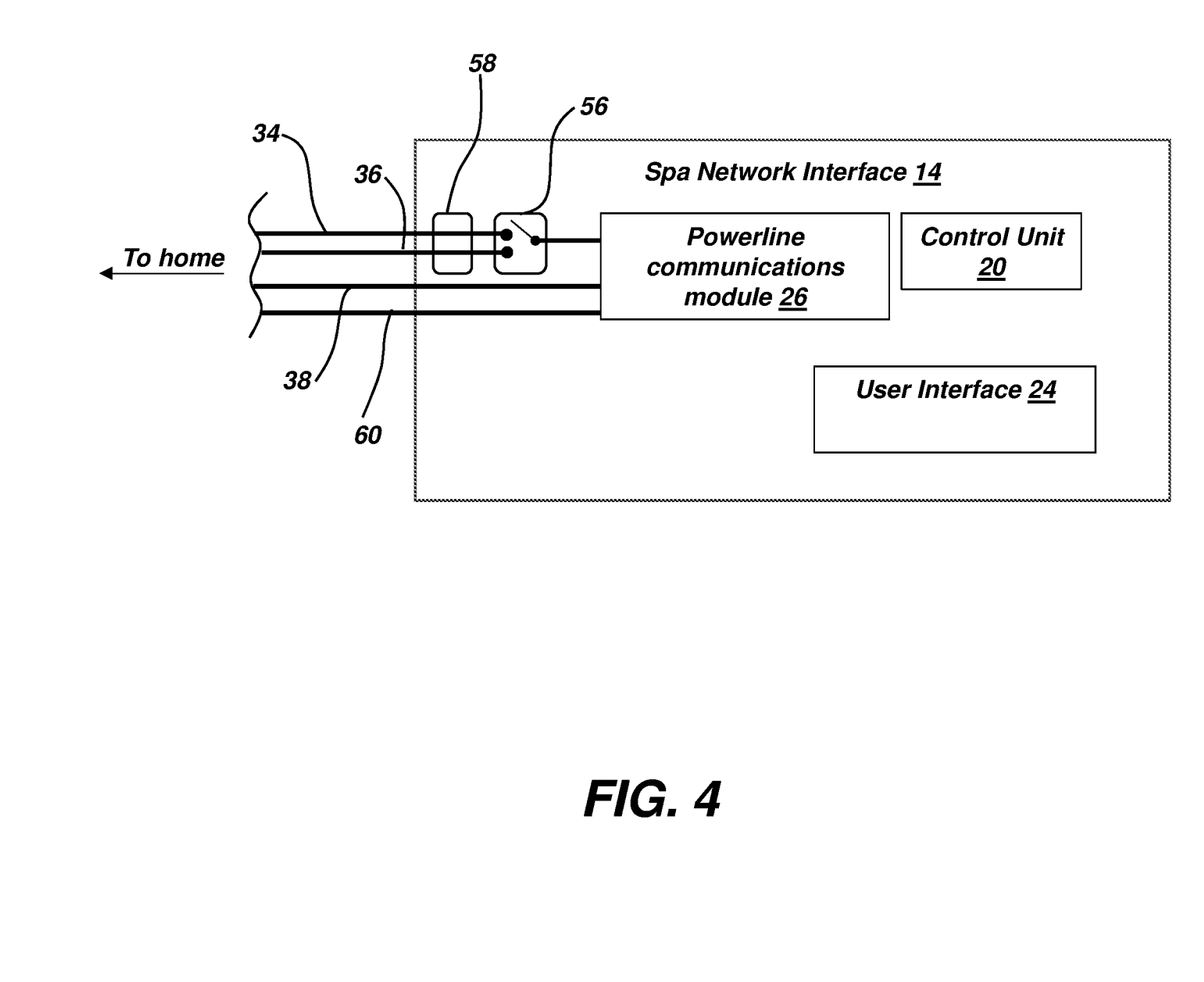
FIG. 4 is a schematic diagram of exemplary circuitry that may be used in a configuration of a power line communications system.

The powerline communication 16 between the in-home network interface 12 and the spa network interface 14 may further comprise an electronic relay 56 and a signal bridge 58 or switch (FIG. 4). The electronic relay 56 and bridge-connected wiring structure 58 may be used to switch the data transmission between the powerlines connected to the spa powerline communication module 26. The power lines connected to the spa powerline communication module 26 may include a first conductor of 120V 34, a second conductor of 120V 36, a neutral conductor 38, and a ground wire 60 (FIGS. 3 and 4). The first conductor of 120V 34 may have a first phase of single split-phase power, and the second conductor of 120V 36 may have a second phase of single split-phase power.

Powerline communications networking may accomplish the best throughput and connectivity, i.e., may be optimized, by having both ends of the network connection on the same phase of electric power. As mentioned above, most homeowners do not know which phase of the single split-phase of power is connected to which outlet or receptacle 44 in their home. Because the spa powerline communication module may have wiring that includes both phases of power (the first 120V conduction 34 and the second 120V conductor 36), plus a neutral conductor 38 and a ground wire 60, several options are available within the system 10 to provide the highest quality connection. Thus, the system 10 may optimize the connection between the in-home network interface 12 and the spa network interface 14.

Figure 5:
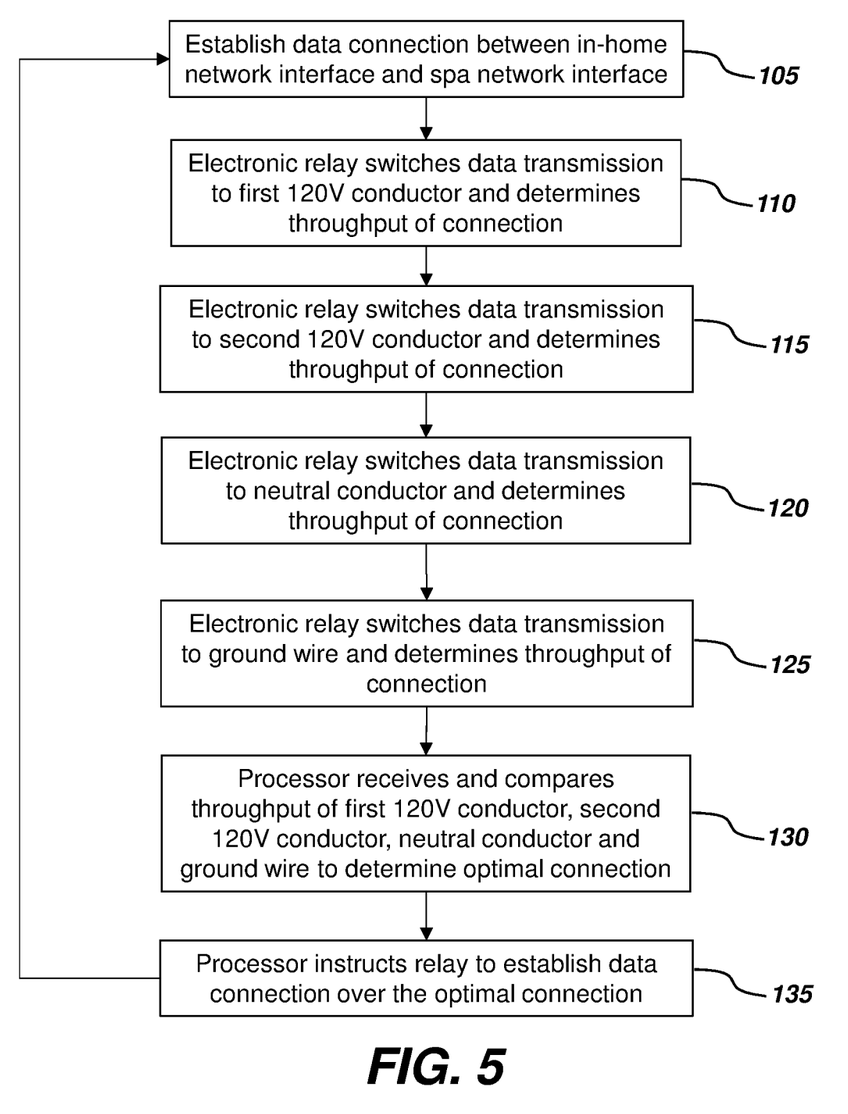
FIG. 5 is a flowchart illustrating a configuration of a method in which the output and connectivity of the power line communications system may be optimized.

According to one aspect, an electronic relay 56 may be used to test the connectivity on both phases of power automatically, and pick the one that provides the best and most reliable connection. FIG. 5 illustrates a flowchart of a method that may be deployed to determine a superior conductor among the lines connected to the spa powerline communications module 26. The electronic relay 56 may be in connection with a processor or microprocessor (which may be integral to spa powerline communications module 26) that switches the relay 56 (utilizing signal bridge 58) between each conductor, and receives information relating to the throughput of each conductor. The steps of FIG. 5 need not be taken in the specific order shown and one or more steps may be taken at the same time.

For example, a system may first establish a data connection between the in-home network 12 interface and the spa network interface 14 (at step 105). An electronic relay 56 may then switch data transmission to first 120V conductor 34 and determine the throughput of connection (110). The electronic relay may then switch data transmission to a second 120V conductor 36 and determine throughput of connection (115). In some configurations, the electronic relay may be in connection with the neutral conductor 38 and ground wire 60 and continue to switch data transmission to these conductors and determine a throughput of connection (at steps 120 and 125 for the neutral and ground wire, respectively).

After a processor and/or control unit has received the throughput of the respective connections, the processor may compare the throughputs to determine an optimal connection (130). The processor may then instruct a relay 56 to establish a data connection over the optimal connection (135).

Based on the throughput, the processor may instruct the relay 56 to select the conductor with the optimized connection. The steps of FIG. 5 may be repeated at any preselected time interval to ensure that the best available connection is being utilized. In another configuration, the steps of FIG. 5 may be performed only after a connection is lost or degrades below a predetermined threshold.

According to another aspect, multiple power line communication modules may be installed at the spa and/or inside the home to make use of both phases of power simultaneously to optimize data transmission over the power lines.

Once an optimized connection has been established, the present system 10 may allow a user to control, via a remote computing device 54, the control unit 20 of the spa 18. In one configuration, a remote computing device 54 may be provided with a user interface, such as an application for a smartphone. Settings to be controlled may include lights, jets, water features, temperatures, cover locks, etc. In addition to controlling settings on a spa or pool 18 remotely via the home network 28, a user may also be enabled to view the settings that are currently being used on the spa or pool 18.

For example, a user may determine if a cover is in place over the spa. In some configurations, the user may select to receive an automatic notification whenever the spa cover is removed. This may improve safety of the spa, such as when children and/or pets may be present. A user may also determine a temperature of the spa and ensure that energy saving settings are used. Similarly, a user may ensure that lights, music, etc., are off when the spa is not in use.

Current spas may be retrofit; however, the spa network interface 14 may also be used in all new manufactured spas as well. To retrofit a current spa, a kit may be provided that may include the powerline communications module 26 which may be hard wired to a spa's existing control unit 20. It will be appreciated that such a kit would not require the user to dig a trench to lay new wiring, but could use existing wiring in place from the spa or pool 18 to the home. For example, the powerline communications module may be wired to an existing control unit, and may include the necessary relay and/or signal bridge which may be connected to existing powerlines for the spa.

Although the foregoing disclosure provides many specifics, such as use of the system in spas, it will be appreciated that pools and other user-controlled water holding devices are contemplated and these should not be construed as limiting the scope of any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

As will be appreciated by a person having ordinary skill in the art, embodiments of the present invention, as described herein, may enable for enhanced systems. For example, embodiments of the present invention may increase efficiency of a systems, reduce energy used by systems, increase safety of systems, and increase comfort levels of users.

What is claimed:

1. A power line communications system for controlling a temperature of a spa, the spa power line communications system comprising:
   a spa comprising a spa tub and a spa heating element, the spa heating element in communication with a spa temperature controller;
   a spa network interface comprised of a control unit electrically connected to the spa temperature controller;
   a spa power line communication module electronically connected to the spa network interface;
   a spa electrical panel electrically connected to a residential circuit breaker panel;
   a first 120-volt conductor, a second 120-volt conductor, a third neutral conductor, and a ground conductor electrically connecting the spa electrical panel to the spa power line communication module;
   a user interface connected to the spa network interface, wherein the user interface is configured to display real-time spa temperature settings and manipulate current spa temperature settings;
   a signal bridge configured to conduct frequencies between the first 120-volt conductor, the second 120-volt conductor, a ground conductor, and the third neutral conductor;

a controller electrically connected to an electronic relay and the signal bridge, the controller programmed to automatically periodically:
- test the connectivity of an in-home power line communication module and the spa network interface via the first 120-volt conductor and determine a first conductor throughput;
- test the connectivity of the in-home power line communication module and the spa network interface via the second 120-volt conductor and determine a second conductor throughput;
- test the connectivity of the in-home power line communication module and the spa network interface via the ground conductor and determine a ground conductor throughput;
- test the connectivity of the in-home power line communication module and the spa network interface via the third neutral conductor and determine a neutral conductor throughput; and
- compare the first conductor throughput, the second conductor throughput, the ground conductor throughput, and the neutral conductor throughput to determine a superior conductor and automatically conduct the frequency to the superior conductor;

the in-home power line communication module electronically connected to the residential circuit breaker panel and an in-home network; and a remote computing device in communication with the in-home network, the remote computing device configured to display the real-time spa temperature settings of the user interface and manipulate current spa temperature settings.

2. The spa power line communications system of claim 1, wherein the first 120-volt conductor has a first phase of a single split phase of power and wherein the second 120-volt conductor has a second phase of a single split phase of power.

3. The spa power line communications system of claim 1, wherein the user interface receives inputs to control the one or more spa controllers.

4. The spa power line communications system of claim 1, wherein the one or more spa controllers comprises controllers for at least one of spa cover, temperature, lights, jets, music or sound, and water features.

5. The spa power line communications system of claim 2, further comprising an in-home network interface comprising a home powerline communications module, a plug configured to be connected to a standard receptacle, and an Ethernet port.

6. The spa power line communications system of claim 5, wherein the in-home network interface and the spa network interface are electrically connected.

7. The spa power line communications system of claim 6, wherein the in-home network interface is electrically connected to a standard power outlet, the standard power outlet having a first phase of a single split phase of power, and the in-home network interface is electrically connected to the spa network interface via the first conductor of 120 volts.

8. The spa power line communications system of claim wherein the in-home network interface is electrically connected to the standard power outlet, the standard power outlet having a second phase of a single split phase of power, and the in-home network interface is electrically connected to the spa network interface via the second conductor of 120 volts.

9. The spa power line communications system of claim 6, wherein the electronic relay is configured to test the connectivity of the in-home network interface and the spa network interface via the a first conductor of 120 volts, the second conductor of 120 volts, the ground conductor, and the neutral conductor to determine a superior conductor.

10. A method for controlling a spa cover lock, comprising:
- providing a spa network interface, the spa network interface comprising a spa powerline communications module electrically connected to the spa network interface, and a spa cover lock controller electrically connected to the spa network interface;
- providing a home network interface, the home network interface comprising a home powerline communications module, a recess for receiving an Ethernet cable, and a standard electrical plug;
- electrically connecting the home network interface to a residential circuit breaker;
- electrically connecting the residential circuit breaker to a spa electrical panel;
- electrically connecting the spa electrical panel to the spa powerline communications module via a first 120-volt conductor, a second 120-volt conductor, a third neutral conductor, and a ground conductor;
- providing a remote computing device in communication with the home network interface, the remote computing device configured to display real-time spa settings of the one or more spa controllers and manipulate current spa settings via a user interface;
- providing an electronic relay configured to test a throughput of each of the first 120-volt conductor, the second 120-volt conductor, the ground conductor, and the third neutral conductor; and further comprising the steps of:
  - establishing a connection between the home network interface and the spa network interface via the first 120-volt conductor and measuring a first throughput;
  - establishing a connection between the home network interface and the spa network interface via the second 120-volt conductor and measuring a second throughput;
  - establishing a connection between the home network interface and the spa network interface via the ground conductor and measuring a third throughput; and
  - establishing a connection between the home network interface and the spa network interface via the third neutral conductor and measuring a fourth throughput;
  - comparing the first throughput, the second throughput, the third throughput, and the fourth throughput to determine an optimal connection; and
  - providing real-time spa settings to the remote computing device.

11. The method of claim 10, the method further comprising establishing a connection between an optimal connection and the home network interface.

12. The spa power line communications system of claim 1 further comprising:
- a spa cover in communication with the spa, wherein the system is configured to automatically send a notification to the user interface if the spa cover is moved.

13. The method for controlling a spa of claim 10, comprising:
- signaling the spa controllers through the user interface to manipulate at least one of spa cover, temperature, lights, jets, music or sound, and water features.

14. The method of claim 10, further comprising the step of receiving, by the home network interface, an instruction from the remote computing device relating to spa settings; and wherein the home network interface communicates the instruction to the spa network interface.

\* \* \* \* \*